United States Patent
Janssen et al.

(10) Patent No.: US 6,512,529 B1
(45) Date of Patent: Jan. 28, 2003

(54) USER INTERFACE AND METHOD FOR MAXIMIZING THE INFORMATION PRESENTED ON A SCREEN

(75) Inventors: Steve Janssen, Ontario (CA); Annette Gottstein-Puri, Ontario (CA)

(73) Assignee: Gallium Software, Inc., Ontario (CA)

( * ) Notice: Subject to any disclaimer, the term of this patent is extended or adjusted under 35 U.S.C. 154(b) by 0 days.

(21) Appl. No.: 09/367,677

(22) PCT Filed: Feb. 19, 1998

(86) PCT No.: PCT/CA98/00125

§ 371 (c)(1),
(2), (4) Date: Nov. 17, 1999

(87) PCT Pub. No.: WO98/37483

PCT Pub. Date: Aug. 27, 1998

(30) Foreign Application Priority Data

Feb. 19, 1997 (CA) .............................................. 2197953

(51) Int. Cl.[7] ................................................. G06F 3/00
(52) U.S. Cl. ...................... 345/790; 345/797; 345/802; 345/803; 345/804; 345/837; 345/856; 345/859; 345/768
(58) Field of Search ................................ 345/781, 790, 345/794, 797, 802, 803, 808, 835, 840, 779, 837, 804, 856, 859, 860, 862, 806

(56) References Cited

U.S. PATENT DOCUMENTS

| 4,121,283 A | * | 10/1978 | Walker ....................... 364/200 |
| 4,882,577 A | * | 11/1989 | Devore ....................... 340/739 |
| 5,548,515 A | * | 8/1996 | Pilley et al. ................. 364/439 |
| 5,625,783 A | * | 4/1997 | Ezekiel et al. ............... 345/810 |
| 5,659,694 A | * | 8/1997 | Bibayan ....................... 345/781 |
| 5,745,714 A | * | 4/1998 | Glass et al. ................. 345/764 |
| 6,072,489 A | * | 6/2000 | Gough et al. ................ 345/797 |

* cited by examiner

Primary Examiner—Raymond J. Bayerl
Assistant Examiner—Cuong T. Thai
(74) Attorney, Agent, or Firm—Fleshner & Kim, LLP (57) ABSTRACT

A system provides a user interface for maximizing an amount of information presented on a computer generated display. The system includes a user interface management system (UIMS) that works with an operating system that manages the computer resources including a display screen and a user input device for tracking position. The UIMS is responsive to the user input device to effect changes in the computer generated display. The UIMS communicates with an application program using the user interface. The user interface has at least a first layer for displaying a primary dynamic image and a second layer for displaying a secondary dynamic image. The second layer has a plurality of display modes including a first mode corresponding to at least a portion of the second layer assuming an invisible state in the computer generated display. Selection of the display modes is effected by signals received from the user input device. Both the first and second layers are updated regardless of the mode of the second layer. The user interface is particularly applicable to air traffic control where the first layer is used for displaying a map plotting aircraft locations and the second layer is used for displaying various data concerning the aircraft, both being updated continuously.

38 Claims, 10 Drawing Sheets

PRIOR ART

USER INTERFACE AND METHOD FOR MAXIMIZING THE INFORMATION PRESENTED ON A SCREEN

The present invention generally relates to methods for displaying graphical information on a computer system, and more particularly, the present invention relates to a computer controlled display system for organizing the display of a high volume of information and a user interface to allow the operator to readily view all sets of information.

BACKGROUND OF THE INVENTION

A windowing environment is system software that manages interactions between a user and an application program executing on a computer through a graphical display monitor. Typically, the graphical display is arranged to resemble an electronic "desktop", and each sheet of information on the "desktop" is displayed in a rectangular region of the screen called a "window". The windows on the "desktop" can be organized in a variety of different ways. They can be tiled so the contents of each window are totally visible to the operator, they can be overlapped so that the contents of a window partially overlays another window, or they can be stacked so that one window completely overlays another window. The windows on the desktop can be used to contain any object, including simple objects such as menus, forms and tables and complex objects such as spreadsheets and radar displays for air traffic control.

In a typical window-based Graphical User Interface (GUI) system (such as Microsoft Windows® or OSF Motif®), a variety of techniques are provided to the operator to manage the windows on the display. The windows can be made larger or smaller, they can be expanded to be the full screen size, they can be moved to a different position on the screen, or they can be reduced to an icon. An icon is a small, visually distinct display object which represents the window.

In a traditional office application, the windows are used to represent static information such as documents and spreadsheets. The content of a window changes only when a change is effected by the operator. However, there is a class of applications where the information in the windows changes dynamically independently of operator intervention. For example, in an Air Traffic Control display, one window may contain a geographic view of the airspace in which aircraft are plotted on the display according to their current position based on radar reports. Another window may have a dynamically changing table summarizing details about each aircraft including information such as current speed and altitude, which is updated based on radar reports.

One of the problems associated with window based graphical user interfaces is the necessity of carefully managing the display screen space. In many complex applications there is a great deal of information which must be displayed to the operator in multiple windows. However, with multiple windows, there is often not enough screen space (screen "real estate") to concurrently view all the important information displayed in various windows. For example, in Air Traffic Control, the focus of the radar operator is on the main situation display window where the operator is tracking the movement of aircraft through the radar plots displayed in the window. The operator also needs to regularly be able to view additional information about the aircraft, weather conditions, etc., as displayed in other windows. However, at the same time, the operator needs to maintain full awareness of the main situation window which reflects the position of all aircraft. The ability to maintain a great number of windows on the screen without obscuring the main window of interest is desired. In these situations, it is too cumbersome and time consuming to use standard window manipulation techniques such as resizing or moving windows.

Other attempts to solve this problem usually involve one of two techniques. The first is to provide either a larger screen surface or multiple screen surfaces to provide enough space to display all of the required data. The drawbacks of this solution are that the additional screen space require more expense and the necessary room to accommodate larger or multiple screens may not be available. The other technique is to dedicate areas of the screen at which to place menus and tables. This reduces the amount of screen space for radar data and for other menus and/or tables which may be required and the operator no longer has the flexibility of deciding for himself the best mix of data for the situation at hand.

A still further problem is that the windowing systems on most modern computers (for X11 windows in the Unix environment) do not update data that lie directly beneath a window. Even if such a window is transparent, it will not be updated. Modern window systems typically cannot process input events on objects that are not drawn.

As will be disclosed, the present invention provides a method of designating windows as invisible so that information in background windows is not obscured, a user interface for viewing and hiding the data in the foreground window on demand, and a method for managing and rendering the displays when working with invisible windows.

SUMMARY OF THE INVENTION

One aspect of the present invention seeks to provide the operator with a rapid means of exposing/hiding information in windows. Another aspect of the invention seeks to provide a method and system for updating images which reside beneath a window.

With regard to the first aspect, the present invention provides a method and user interface technique that allows the operator to maintain a large number of windows all containing information necessary for the operator to perform his task, while at the same time not obscuring other windows which are essential to perform the task. This approach significantly increases operator productivity and also increases safety when employed in safety critical applications since it permits the operator to maintain maximum awareness of the main safety critical situation window, while still providing immediate access to the other information necessary for the operator to perform his task.

The invention operates in a standard environment of computer workstation with a graphical display. Information is displayed in "windows " on the graphical display, and the operator interacts with the display with standard input devices such as a keyboard and a mouse. This invention may be embodied in an application program that executes on the workstation or any other type of program, including the Operating System which controls the workstation.

This invention consists of a user interface which provides the operator with a rapid means to expose and hide information in invisible windows. When the information in windows is hidden, the "invisible" windows can be totally invisible (i.e., there is no visual indication of their location), the windows may have a title bar that is visible, the windows may have a window border that is visible, or the windows may have a title bar and window border that is visible. These latter states provide the operator with a visual clue as to the location of the hidden window. In all these cases, the contents of the invisible window are not displayed and the background window is fully visible through the invisible window.

The user is provided the ability to designate each invisible window as "normal", "timed", "locked", or timed icon". The user is also able to reduce an invisible window to an icon at any time. When an invisible window is reduced to an icon no window operations can be performed on the window until the icon is raised back into an invisible window.

When in "normal" mode, the contents of the window are exposed when the cursor moves into the area of the window. The window contents can be exposed either by allowing the window to be displayed on an opaque background, which enhances legibility of the window contents, or on a transparent background, which enables the contents of the background windows to be visible underneath the invisible window. The window contents are hidden again by simply moving the cursor away from the window.

In "timed" mode, the contents of the window are exposed in the manner described above for a specified period of time, at which time the window automatically returns to its invisible state. In the "locked" mode, the contents of the window are exposed in the opaque manner described above until another mode is selected for the window. In the "timed icon" mode, the contents of the window are exposed in the manner described above for a specified period of time, at which time the window is automatically reduced to an icon.

With regard to the second aspect, the invention can render windows which are not directly contained in the computer's native windows and provides unique drawing strategies to ensure that updates occur to data that lay beneath a given window.

Thus, windows can occupy the same display area, yet the operator can rapidly select which objects to view without losing situational awareness. The expense of larger screen surface area and the restriction of dedicated table/menu areas is eliminated.

BRIEF DESCRIPTION OF THE DRAWINGS

These and other features of the invention will become more apparent from the following description in which reference is made to the appended drawings in which.

Some numeral references will denote same parts throughout the description.

DETAILED DESCRIPTION OF PREFERRED EMBODIMENTS OF THE INVENTION

Figure 1:
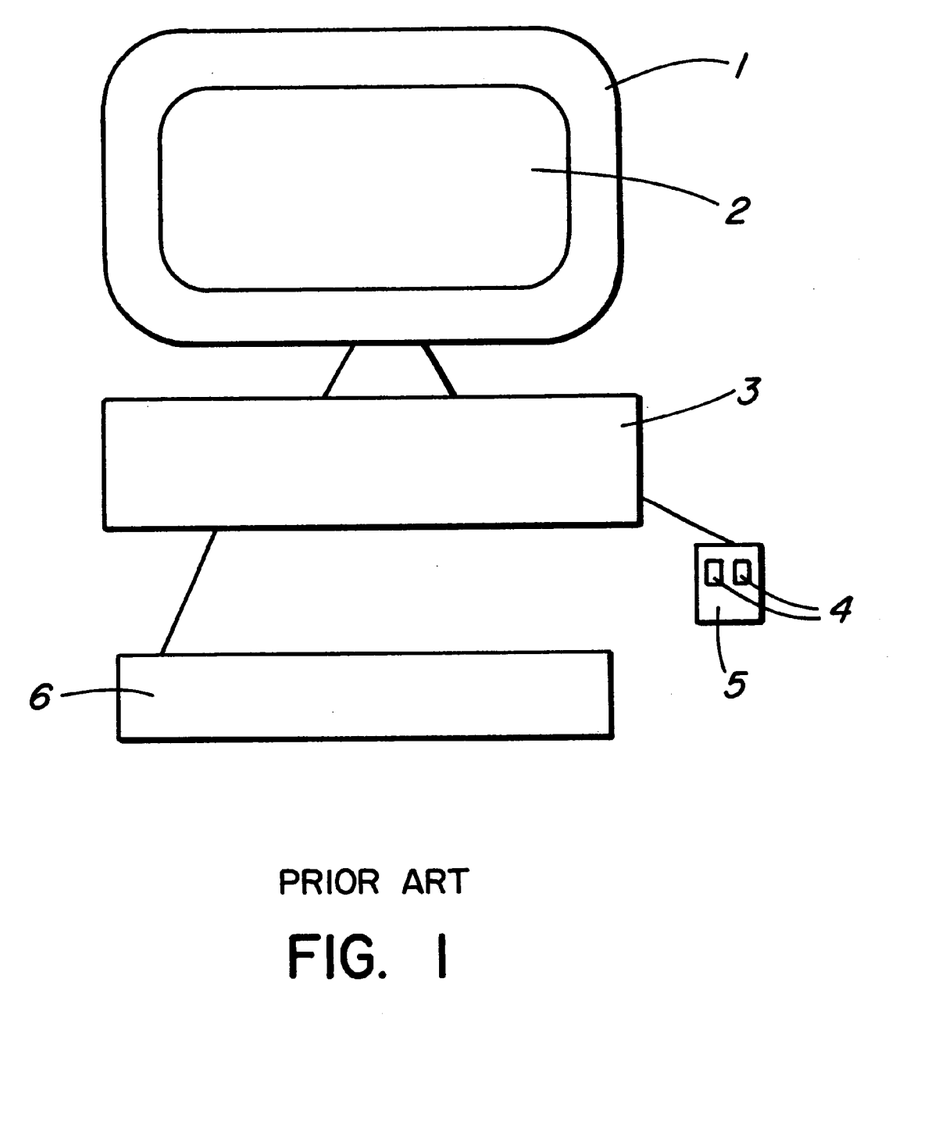
FIG. 1 is a pictorial front view of a typical computer.

FIG. 1 depicts a typical computer system suitable for supporting the present invention. FIG. 1 is but one of many computer configurations that can support the present invention. FIG. 1 shows a computer system consisting of an output device 1 (display monitor), input devices (mouse 5 and keyboard 6) and a system chassis 3. Other configurations might include flat screen displays, X-terminals, trackballs, touch screens and other devices.

The system chassis 3 contains components such as the Central Processing Unit (CPU), memory, hard disk storage, power supply, local area network, parallel printer I/O, serial I/O, and video generation hardware. The system chassis 3 may contain optional items such as CDROMs, tape drives, sound generation facilities and others.

The present invention provides a means to efficiently manage screen space when there are conflicting demands of high priority information in background windows which occupy large portions of the display surface 2 and numerous information windows overlaying it. The present invention can be implemented at four different levels in a computer system. It can be applied in the graphics generation hardware, the operating system graphics subsystem software (X Windows, OpenGL®, Microsoft Windows ®, Apple MacO/S®, etc.), a User Interface Management System (UIMS), or in application software. The discussion below deals mostly with implementation of the present invention in a UIMS and associated application programs. A UIMS is a layer of software which manages all display and user device input activities for a specific application. The description is divided into three parts: Part 1 describes the invention as manipulated by the operator; Part 2 describes the invention in terms of the software algorithms which describe its operation; Part 3 describes the features of the UIMS to support the event capture and drawing techniques necessary.

Part 1

Figure 2:
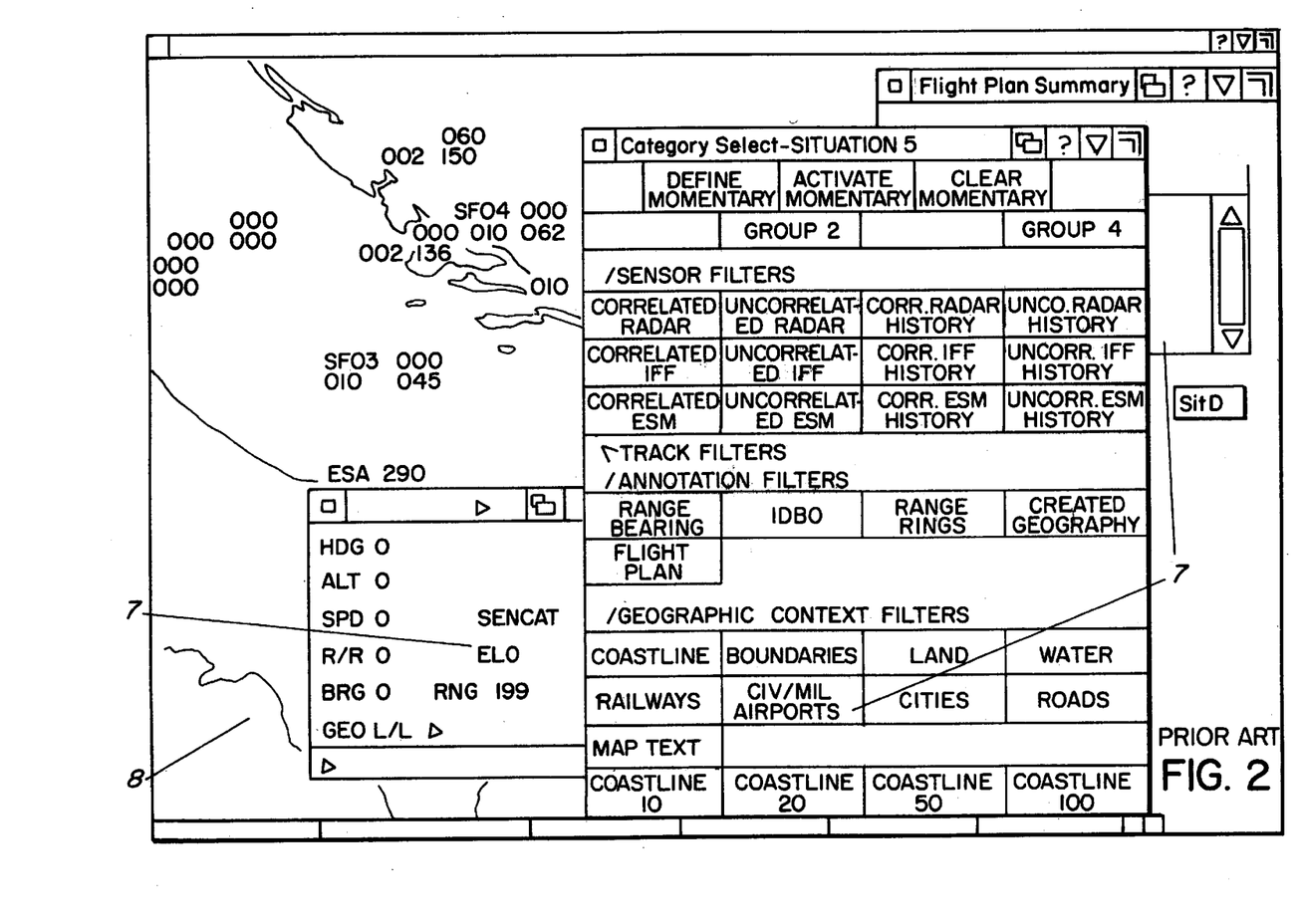
FIG. 2 is a display presentation of an opaque window technique.

FIG. 2 depicts a typical application display presentation where the present invention would greatly enhance operator usability and operator access to important data. In this view, normal windowing techniques are in force. The high importance background data 8 (radar return information in this case) is being obscured by multiple overlapping user interface windows 7.

These overlapping windows 7 are a necessary part of the user's displayed information set. They are explicitly requested by the user and necessarily appear on top of the background data 8. The present invention provides the operator with techniques to control their property of covering underlying data.

Figure 3:
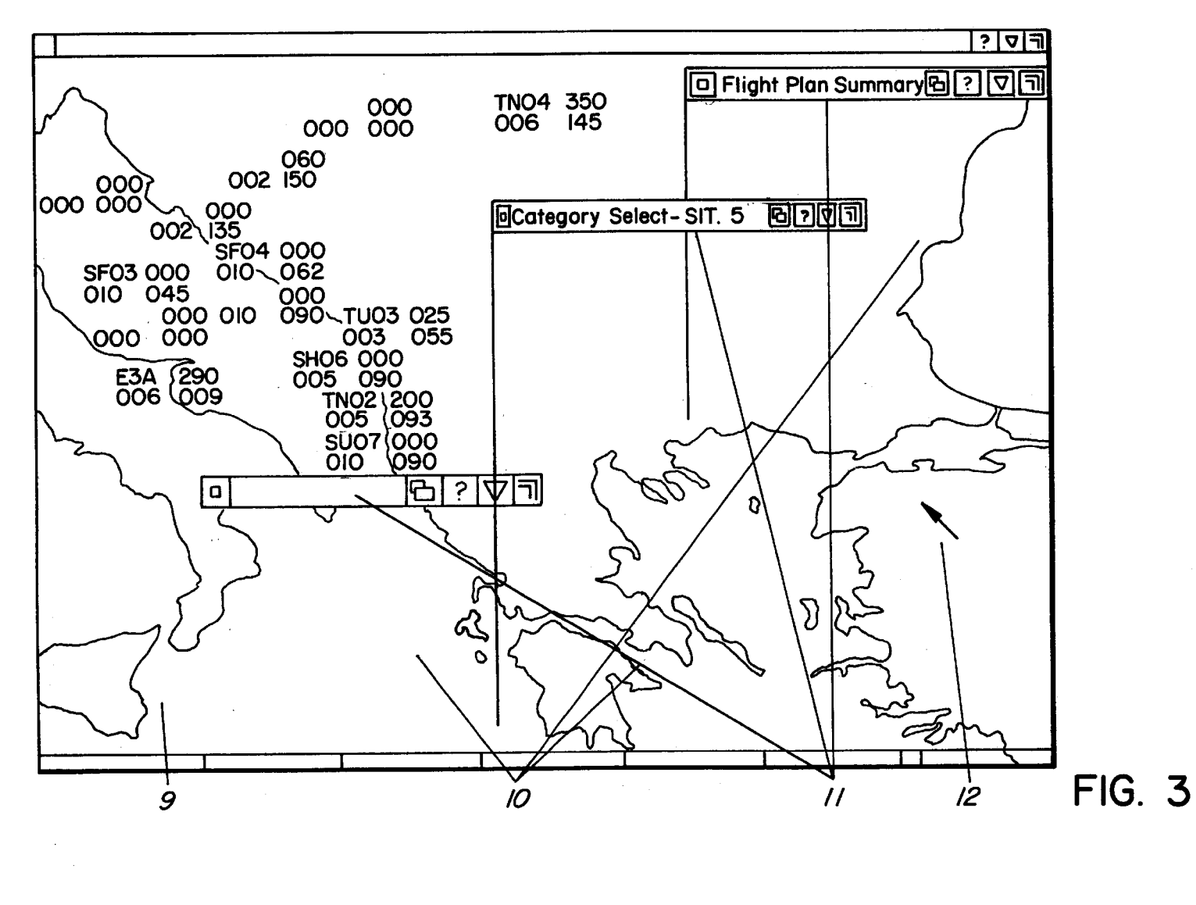
FIG. 3 is the display presentation of FIG. 2, using a transparent window technique according to the invention.

FIG. 3 depicts the same application with the invisible window feature operating. Notice now that the overlapping windows 10 no longer obscure the background radar data 9. The overlapping windows' title bars and window frames 11 are still visible giving the user visible cues as to where the windows will be when opaque. The view of the background radar in FIG. 3 is vastly improved over that in FIG. 2.

The technique which the operator uses to toggle between opaque and invisible is as simple as moving the cursor 12 over the invisible window which the operator wishes to view. In FIG. 3 the cursor 12 is over the background data 9, not an overlapping window 10. This causes all overlapping windows 10 to be invisible.

Figure 4:
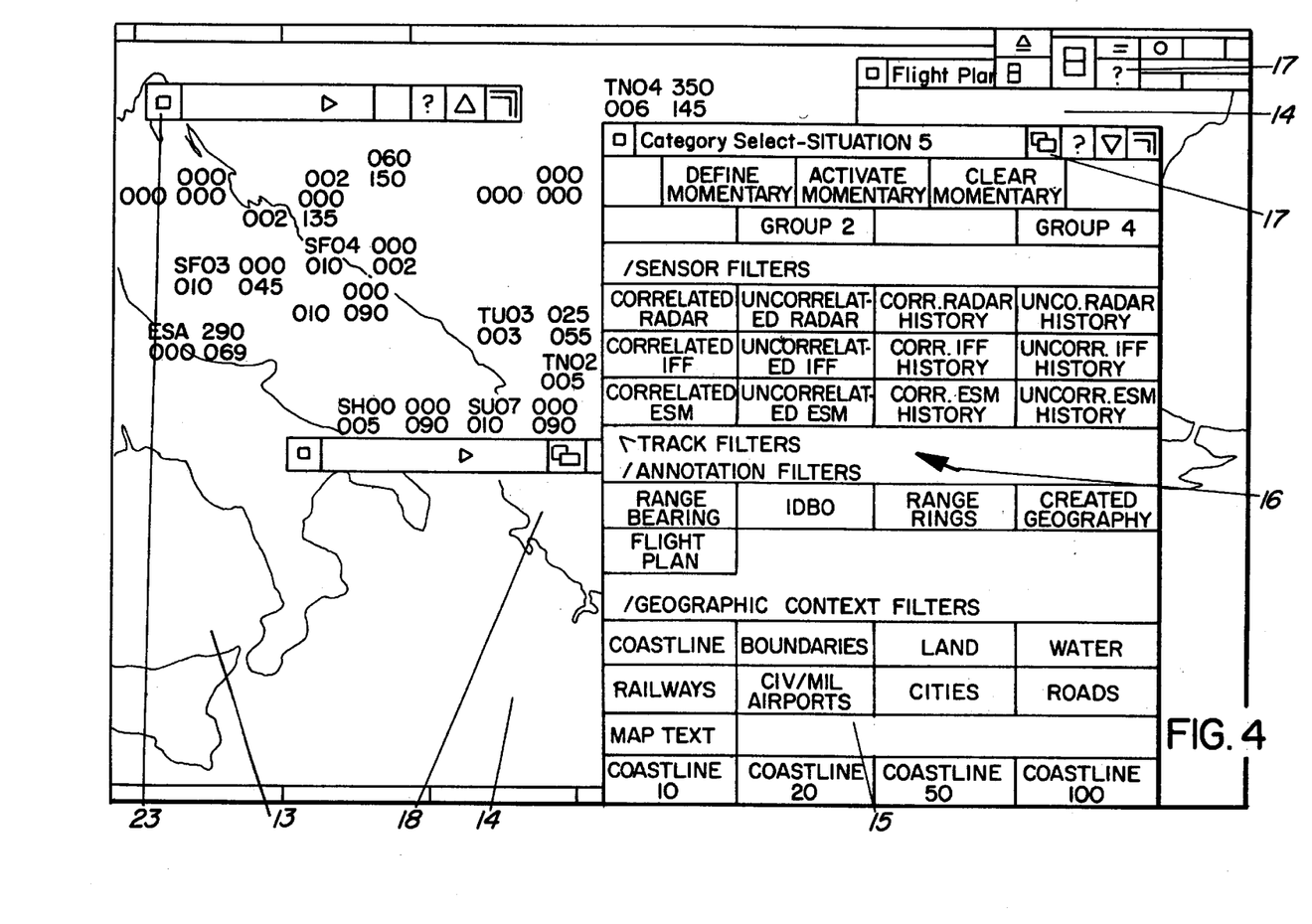
FIG. 4, illustrates the display of FIG. 2 when the cursor is moved over the transparent window.

FIG. 4 demonstrates the system's reaction to moving the cursor over an invisible window. Notice that the cursor 16 is now over the table titled "Category Select-CATEGORY" 15. This table is now opaque while the others 14 remain invisible. The background data 13 is covered by tables 15 but remains unaffected by tables 14.

Figure 5:
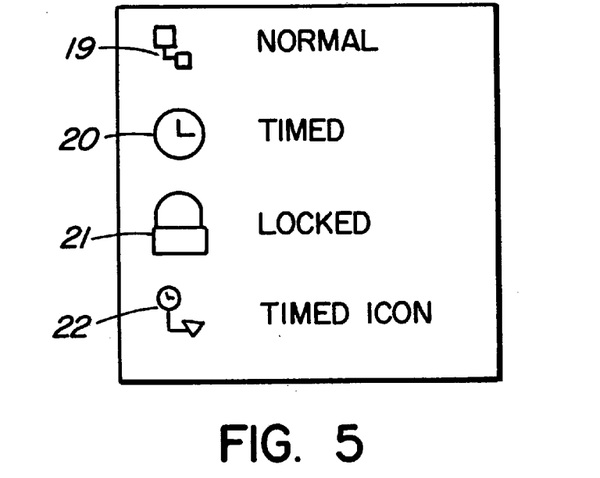
FIG. 5 shows the display mode menu.

Further control of the invisible effect is afforded the operator through a button in the title bar of the tables 17. Activating this button causes the display mode menu 18 to be activated. FIG. 5 depicts the display mode menu. The menu consists of four buttons 19, 20, 21, 22. Each button has a graphical icon and textual label. When a button is selected, its icon is placed in the display mode menu 18 as seen in buttons 17 of FIG. 4. Each window can be placed in a separate mode.

Button 19 is used to activate the Normal display mode. In this mode all overlapping windows are invisible by default. A window becomes opaque when the cursor is placed within its extent. When the cursor leaves its extent the window becomes invisible again.

Button 20 is used to activate the Timed display mode. In this mode all overlapping windows are invisible by default. A window becomes opaque when the cursor is placed within its extent. When the cursor leaves its extent the window becomes invisible only after a time-out has occurred. This time-out is programmable but is typically 10 seconds. The time-out is terminated if the cursor is placed over the window before it turns invisible.

Button 21 is used to activate the Locked display mode. In this mode the overlapping windows are always opaque.

Button 22 is used to activate the Timed-icon display mode. In this mode all overlapping windows are invisible by default. A window becomes opaque when the cursor is placed within its extent. When the cursor leaves its extent a two step time-out process begins. After the first time-out, the window goes invisible and the second time-out begins. After the second time-out, the window automatically iconifies. Window 23 in FIG. 4 illustrates an iconified window. These time-outs are configurable but are typically ten seconds. The time-outs are terminated if the cursor is placed over the window before the operation completes.

The activation of any of the Normal, Locked, Timed, or Timed-Icon buttons causes the mode data field on the associated window to be updated to the appropriate mode.

Part 2

Figure 6:
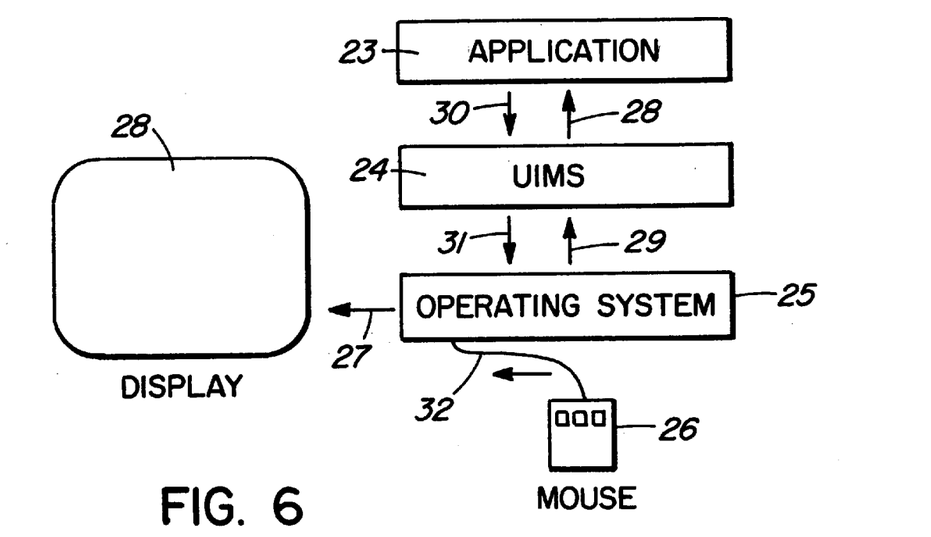
FIG. 6 shows the general software architecture of a transparent window system according to the invention.

FIG. 6 illustrates the general software architecture of the invisible window system. A window has three pieces of data associated with it for the purposes of this discussion. Each window has a unique identity stored in window id. Each window can operate in one of four modes: Normal, Locked, Timed, or Timed-Icon. Finally, each window can be in one of three states: invisible, opaque or iconified.

The following steps describe the action of moving the mouse from an opaque state window onto the background data.

The user moves the mouse 26 pointer from an opaque state window to the background which generates a hardware event 32. The operating system 25 services the hardware mouse event 32 and passes a message 29 to the UIMS 24. The UIMS 24 maintains the extent of all objects it manages. It traverses this list examining each window's extent to determine if the cursor now lies within the same window as the previous event. If the UIMS 24 does not find a match, the UIMS checks if the cursor was previously on an opaque window. If true, the UIMS 24 next determines if that window has been designated as a potentially invisible window. If the window is designated as potentially invisible the application defined invisible state 30 is applied to the window by the UIMS 24. The user may specify the invisible state 30 to the UIMS such that the entire window becomes invisible or just user specified portions of it become invisible. The application of this state causes the UIMS 24 to redraw the window on the display 28 according to the invisible state specifications.

The following steps describe the action of moving the mouse from the background data onto a window which is currently invisible.

The user moves the mouse 26 pointer over an invisible window which generates a hardware event 32. The operating system 25 services the hardware mouse event 32 and passes a message 29 to the UIMS 24. The UIMS 24 maintains the extent of all objects it manages. It traverses this list examining each window's extent to determine if the cursor now lies within that extent. If the UIMS 24 finds a match, it next determines if that window has been designated as an invisible window. If the window is designated as potentially opaque the application defined normal state 30 is applied from the window by the UIMS 24. The application of this state causes the UIMS 24 to redraw the window on the display 28 according to the normal state specifications. The UIMS 24 notes the fact that the cursor is over a particular window which is now opaque.

The details of how the UIMS searches input matches on windows and how data beneath invisible windows is updated are detailed in PART 3.

Figure 7:
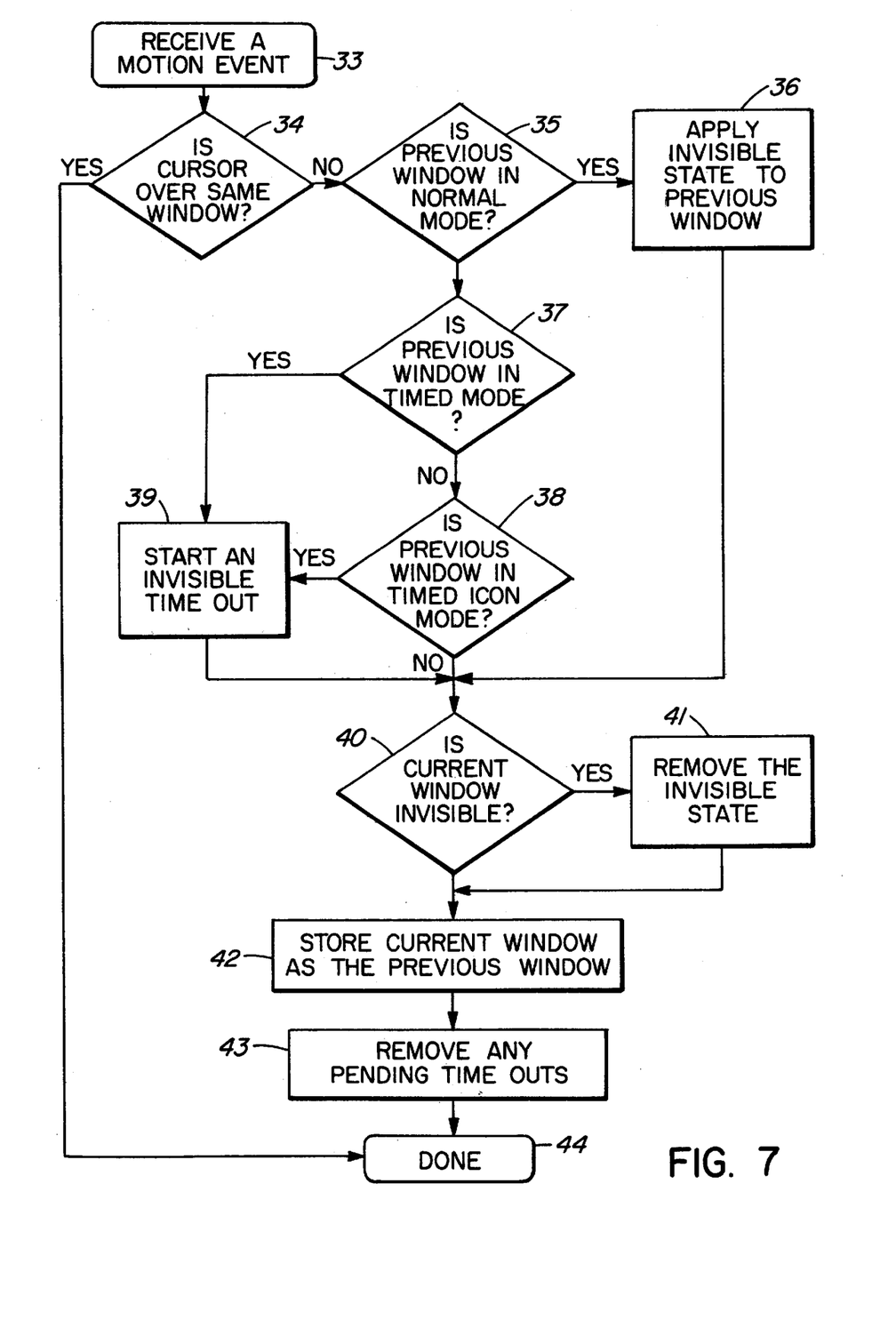
FIG. 7 is a flowchart illustrating the logic used to process a motion event detected on a window.

FIGS. 7 through 10 depict flow chart views of the logic within the UIMS 24. When the lower levels of the UIMS (see Part 3) detect a motion event on a window, an algorithm depicted in FIG. 7 is initiated 33. The algorithm compares 34 the window id in the event message with the stored previous window id. If the window ids are the same, the algorithm terminates 44.

If the current and previous window ids do not match, the mode of the window is tested 35. If the window is in normal mode then apply the invisible state to the window 36. If the window is not in normal state then test to see if it is in Timed mode 37. If the window is in Timed mode then schedule a "timed invisible" time out event to start 39. If the window is not in Timed mode then test to see if it is in Timed-Icon mode 38. If the window is in Timed-Icon mode then schedule a "timed invisible" time out event to start 39. Regardless of which mode the current window is in the state of the previous window is now tested 40. If the current window is invisible, remove the invisible state 41 to make the window opaque. Next, store the current window id as the previous window id 42 and remove any time outs that may be pending on the window from previous cursor movement 43. This algorithm now terminates and regular processing continues.

Figure 8:
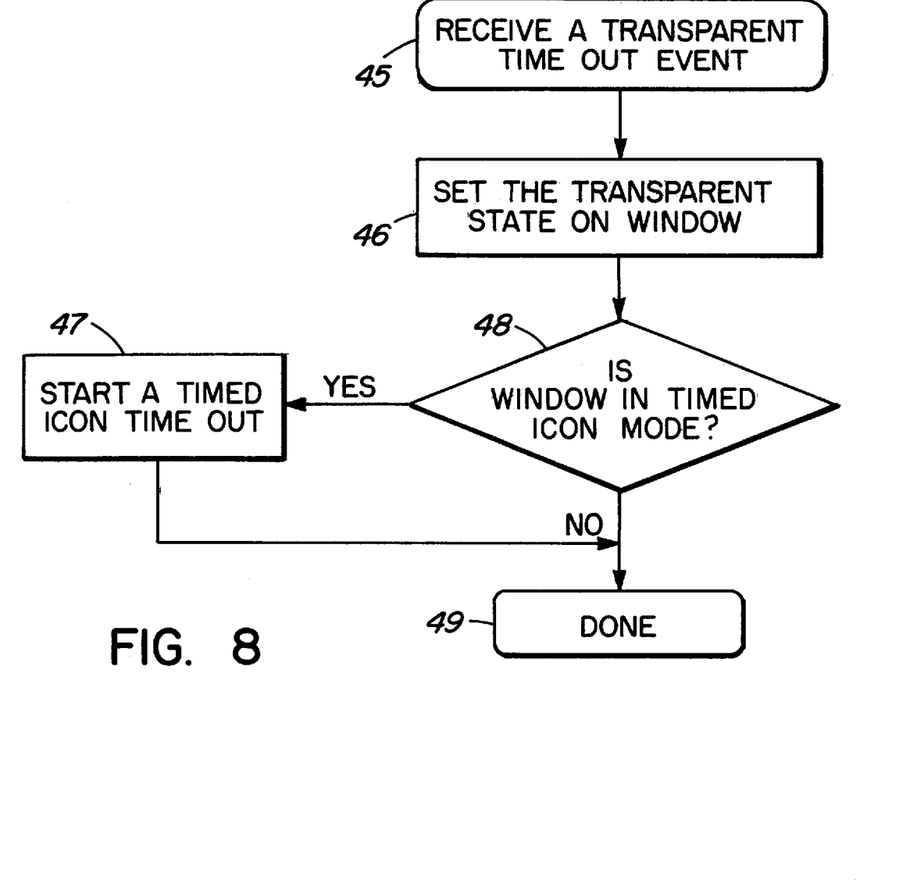
FIG. 8 is a flowchart illustrating the logic used to process a transparent time out event.

FIG. 8 depicts the algorithm used to process "timed invisible" time out events. The algorithm is initiated when a time out of type "timed invisible" is received 45. The window state is set to invisible and the window is checked to see if it is in Timed-Icon mode 48. If it is a new time out of type "timed icon" is initiated 47. The algorithm now terminates 49.

Figure 9:
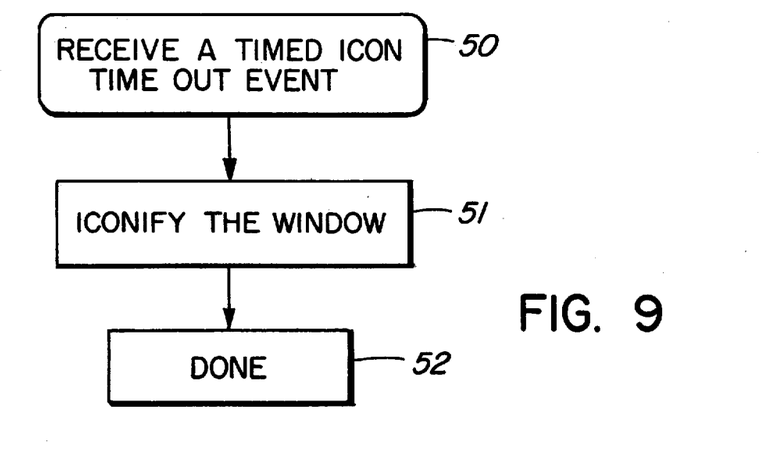
FIG. 9 is a flowchart illustrating the logic used to process a timed icon time out event.

FIG. 9 depicts the algorithm used to process "timed icon" time out events. The algorithm is initiated when a time out of type "timed icon" is received 50. The window state is set to iconified 51. The algorithm now terminates 52.

Part 3

To support the above described behavior the invention embodies the capabilities described below.

The UIMS of FIG. 6 contains application-oriented objects, hierarchical InterMAPhics display lists, and one or more rasterized images. Representations of the objects are maintained in the display lists by the presentation manager, and the rasterized images are created from the display lists by the renderer. This is shown in detail in FIG. 10.

Figure 10:
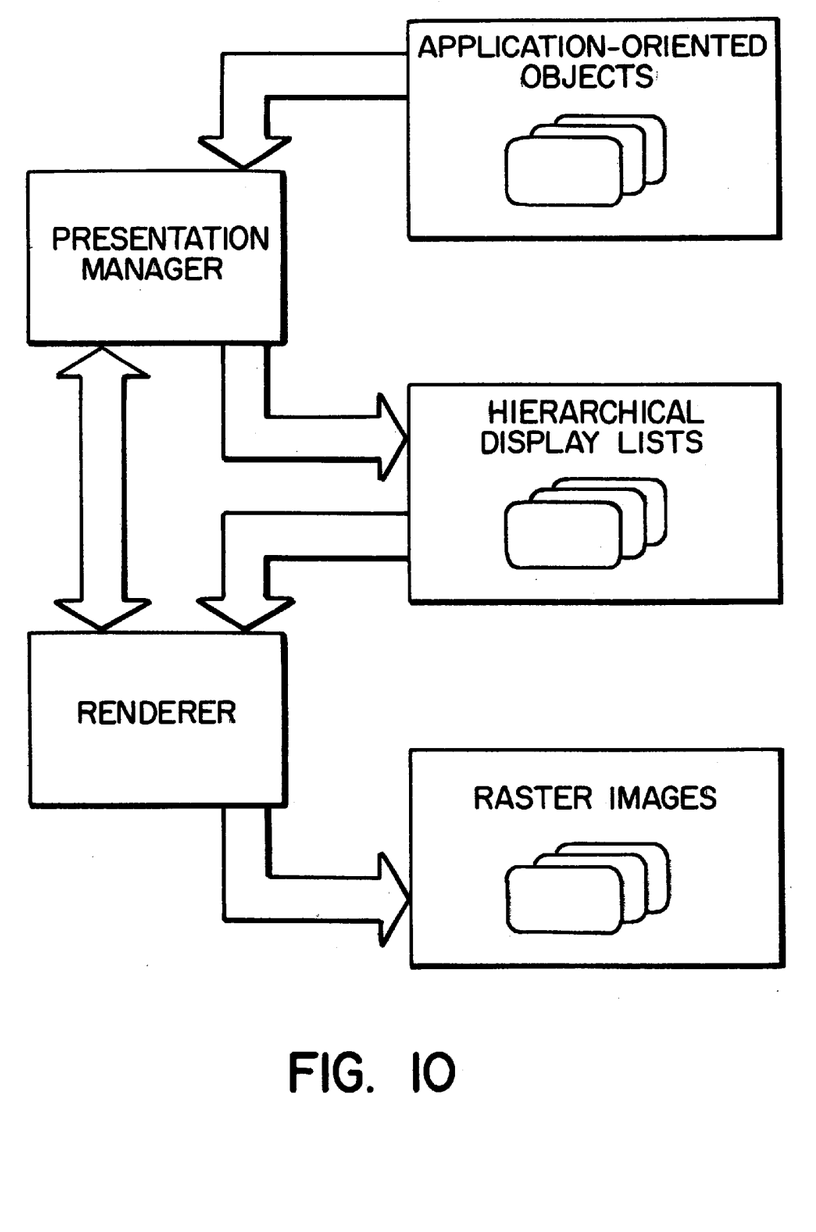
FIG. 10 shows application oriented objects contained in the system of FIG. 6.

The application-oriented objects include the user interface windows used to present information to the operators. Each object has the following properties:

a number of representations each defined by an overall display layer and position, individually layered and positioned object components, and symbolic references to UIMS graphical constructs for each component;

a number of logical states defined by UIMS keys linked to representation changes; and a number of behaviors defined by UIMS actions linked to symbolic object events.

The specification of object properties is via UIMS configuration data, typically loaded at system startup.

The presentation manager maintains the hierarchical display lists according to the current properties of the application-oriented objects. The presentation manager provides the following functionality:

inserts, modifies, and deletes graphical data in the display lists to reflect the representation properties of the application-oriented objects maintains a hierarchical ordering among and within the display lists to reflect the layering properties of the application-oriented objects maintains a mapping from all graphical data in the display lists to the application-oriented object with which the data is associated translates operating system input events to symbolic object events on an object-by-object basis invokes UIMS actions as required to implement the behavior of the objects.

Updates to application-oriented objects and operating system inputs invoke this functionality. Operating system inputs are translated to symbolic object events via UIMS configuration data, typically loaded at system startup.

The hierarchical UIMS display lists contain graphical data describing the appearance of the display. The display lists have the following characteristics:

graphical data consisting of vector-based graphical primitives and symbolic graphical attributes such as color, drawing style, and text characteristics;

a hierarchical structure, whereby any display list may contain other display lists as well as graphical data;

the display lists, their contained display lists, and the graphical data are sorted from lowest layer (underlying) to highest layer (overlying) relative to the containing display list.

The presentation manager establishes and maintains these characteristics, which are referenced by the renderer.

The renderer maintains rasterized images according to the contents of the display lists. The renderer provides the following functionality:

traverses the display list hierarchy in either ascending and descending sort order performing vector-by-vector conversion of graphical primitives to raster images (rendering). This traversal can be constrained by an image extent or distance from a specific image pixel;

determines a set of rendered pixels for each primitive. This is based on the primitive vectors and a translation of the symbolic graphic attributes for drawing styles and/or text characteristics;

determines a value to be applied against the raster image for each rendered pixel. This is based on a translation of the symbolic graphic attributes for color determines a logical function for each rendered pixel specifying how the pixel value is to be applied against the raster image. This is based on a translation of the symbolic attributes for color, drawing styles, and/or text characteristics. For transparent pixels, the logical function leaves the corresponding pixel in the raster image unchanged, while for opaque pixels the logical function replaces the corresponding pixel in the raster image. Other logical functions provide different visual effects;

updates one or more raster images from the rendered pixel set, values, and functions determined from a primitive;

copies some or all of one or more raster images to the hardware video memory.

The presentation manager invokes this functionality to request visual updates or to determine which primitives in the display list contain specific pixels in their rendered pixel set. Symbolic graphical attribute translation to pixel sets, values, and logical functions is through a mapping specified by UIMS configuration data, typically loaded at system startup. This mapping supports transparency through transparent colors and hollow fill drawing styles.

The raster images are either mapped directly to video memory by the graphics display hardware, or are exact images which can be block copied directly to the video memory. The raster images have the following characteristics:

an array of pixel values arranged exactly as required for video display;

overlying objects have been rendered after underlying objects, so that pixels rendered for the overlying objects modify or replace those of underlying objects.

The renderer establishes and maintains these characteristics.

Figure 11:
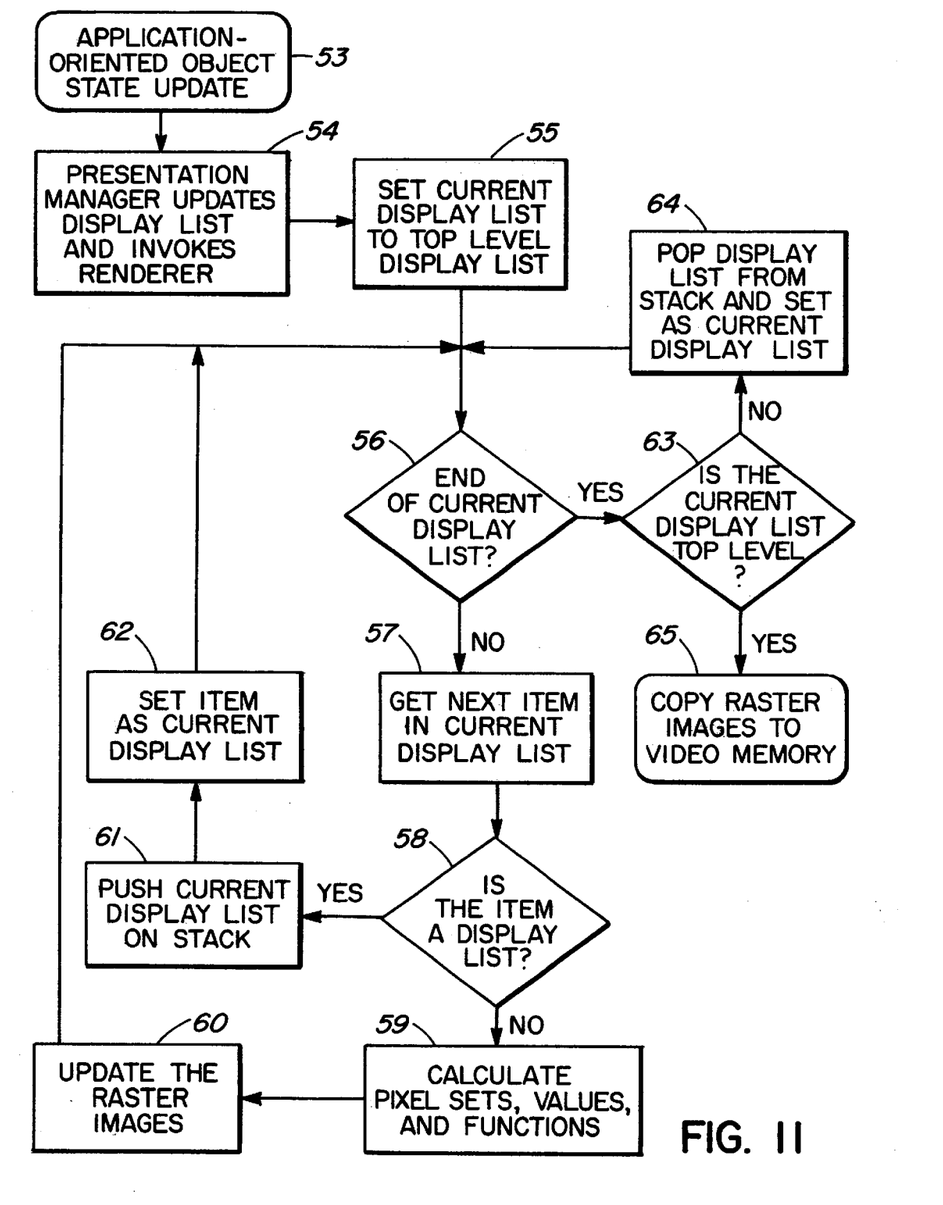
FIG. 11 is a flowchart illustrating the logic used to update areas located under a transparent window.

FIG. 11 depicts the algorithm used to update areas beneath the transparent user windows. An application-oriented object behind a transparent window is updated through a change in logical state 53. The presentation manager updates the object representation in the display list by modifying the graphical primitives and attributes associated with that object to reflect its new state 54. The renderer then traverses the hierarchical display list structure as follows. The current display list is set to the top level display list 55. While the end of the current display list has not been reached 56, the next item in the display list is processed 57. If this item is not an embedded display list 58, the renderer determines the rendered pixel set, pixel values, and logical functions for the graphical data associated with the item 59. The renderer updates the raster images from the rendered pixels 60. This continues until the end of the current display list has been reached 56. If an item in the display list is itself an embedded display list 58, the renderer pushes the current display list onto a LIFO stack 61, and sets the current display list to the embedded display list 62. The renderer continues processing with this display list 56. When the current display list has been completely processed 56, and it is not the top level display list 63, the renderer sets the most recently pushed display list as the current display list 64, and continues the processing of that display list 56. If the completed display list is the top level display list 63, rendering is complete. The renderer copies the updated raster images to video memory 65. Note that all graphical items in the display list are rendered 59, 60, regardless if they are overlain by an opaque or transparent object. In the opaque case, the rendered pixels of the underlying object are replaced by the rendered pixels of the overlying object 60. In the transparent case, the rendered pixels of the underlying item are unaffected by the rendered pixels of the overlying item 60.

Figure 12:
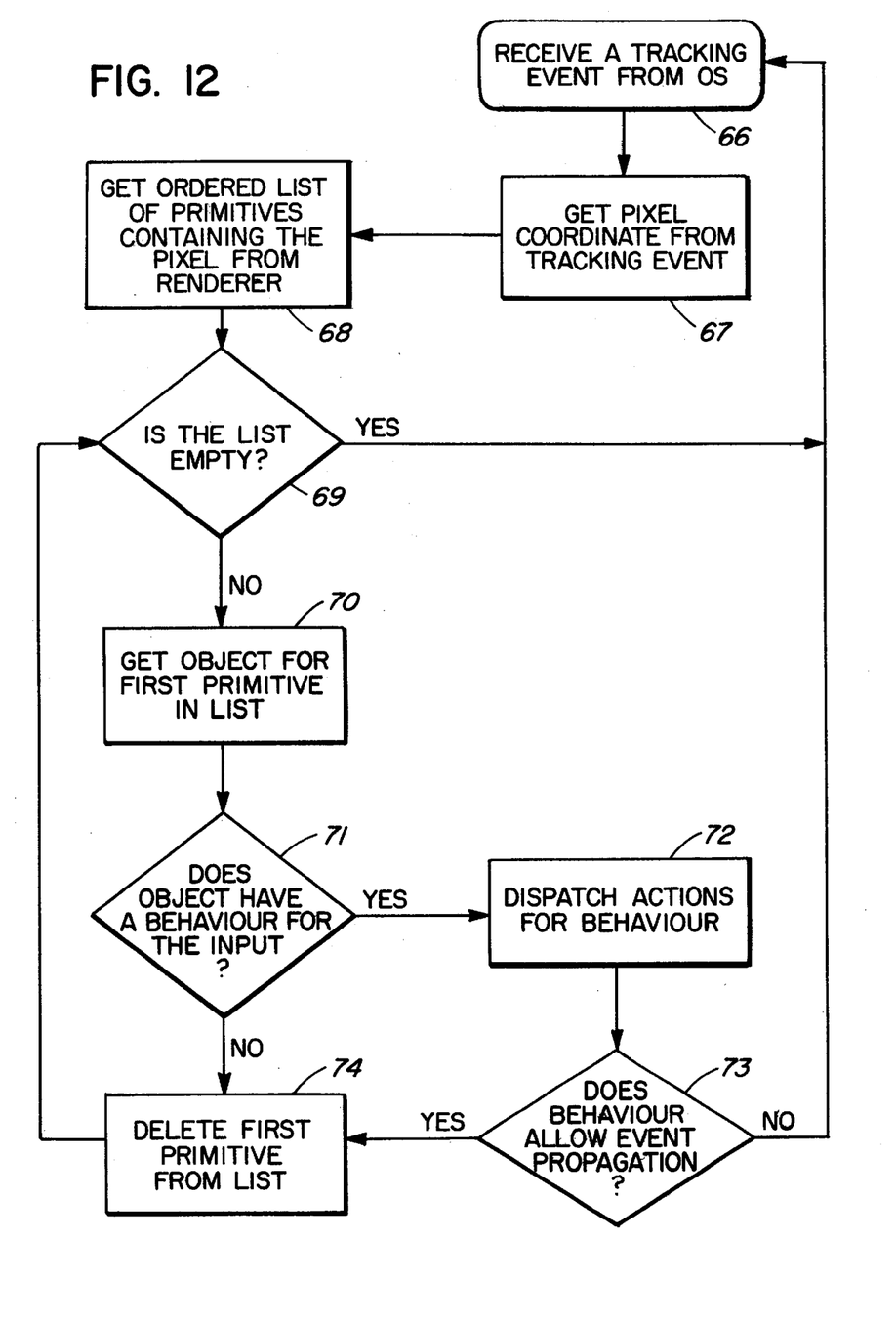
FIG. 12 is a flowchart illustrating the logic used to implement behavior for objects which are invisible.

FIG. 12 depicts the algorithm used to implement behavior for objects which are invisible. The operator moves a tracking device connected to the system hardware. The operating system sends a notification of the motion 66 and a report on the new tracking position to the presentation manager 67. The presentation manager invokes the renderer to determine which primitives in the display lists, searched from uppermost to lowermost layers, contain the current tracking pixel in their rendered pixel set 68. Note that the rendered pixel set also contains all transparent pixels for any primitive. If no primitives are found by the renderer 69, the presentation manager awaits the next operating system event 66. If the list contains at least one primitive, the presentation manager accesses the application-oriented object associated with the first primitive in the list 70. If it can map the operating system event to a symbolic object event for the application-oriented object 71, it invokes the UIMS actions linked to the object event through its behavior definition 72. The object behavior definition either terminates the input event processing or instructs the presentation manager to propagate it through to the next underlying object 73. If processing is complete, the presentation manager awaits the next operating system event 66. If the event is to be propagated 73, or the event cannot be mapped to a symbolic object event 71, the presentation manager deletes the primitive from the list 74, and continues processing while there are primitives remaining in the list 69.

We claim:

1. A graphical user interface, comprising:
   a first display layer for presenting a primary dynamic image;
   a display position indicator responsive to a user input device; and
   a second display layer for presenting a secondary dynamic image related to the primary dynamic image and positionable relative thereto, the second display layer having visible and transparent modes and assuming the visible mode in accordance with a predetermined user selection, wherein the primary and secondary dynamic images are automatically updated regardless of position or mode of the second display layer.

2. The graphic user interface as claimed in claim 1, wherein the mode of the second display layer is selected according to a position of a display position indicator.

3. The graphical user interface of claim 2, wherein the mode of the second display layer is visible when the position of the display position indicator is within a boundary of a display window of the second display layer.

4. The graphic user interface as claimed in claim 1, wherein the user selection is one of a normally transparent mode, a timed mode, a locked mode, and a timed-icon mode, wherein for the normally transparent mode the second display layer is normally transparent, for the timed mode the second display layer is visible for a predetermined period of time and then becomes transparent, for the locked mode the second display layer is locked in the visible mode, and for the timed-icon mode the second display layer is visible for a predetermined period of time and then changes to an icon.

5. The graphical user interface as claimed in claim 4, wherein the user selection is performed by depressing a prescribed button of the user input device.

6. The graphical user interface as claimed in claim 5, wherein the user input device comprises buttons labeled normal, timed, locked, and timed-icon that correspond to the modes.

7. The graphical user interface of claim 4, wherein during the normally transparent mode, the second display layer becomes visible when a position of the display position indicator is within a boundary of a display window of the second display layer.

8. The graphical user interface of claim 1, wherein the is the primary dynamic image and the secondary dynamic image are updated without requiring a user command.

9. The graphical user interface of claim 1, wherein a window of the second display layer is in the visible mode when the display position indicator is placed within a boundary of the window of the second display layer, and is in the transparent mode when the display position indicator is not within a boundary of the window of the second display layer.

10. The graphical user interface of claim 9, wherein the window of second display layer remains in the visible mode for a prescribed period of time after the display position indicator has moved without the boundary of the window of the second display layer, and subsequently changes to the transparent mode.

11. The graphical user interface of claim 1, wherein the second display layer is normally displayed as a visible icon, wherein the second display layer is visible when the display position indicator is positioned over at least a portion of the visible icon, and remains visible for a prescribed period of time after the display position indicator is no longer positioned over at least a portion of the visible icon.

12. The graphical user interface of claim 1, wherein the transparent mode of the second display layer comprises a visible title bar.

13. The graphical user interface of claim 1, wherein the transparent mode of the second display layer comprises a visible window border.

14. The graphical user interface of claim 1, wherein the transparent mode of the second display layer comprises a visible title bar and a visible window border.

15. The graphical user interface of claim 1, wherein the transparent mode of the second display layer comprises a visible title bar.

16. The graphical user interface of claim 1, wherein the transparent mode of the second display layer comprises a visible window border.

17. The graphical user interface of claim 1, wherein the transparent mode of the second display layer comprises a visible title bar and a visible window border.

18. The graphical user interface of claim 1, wherein when the second display layer is in the transparent mode, a title bar and a window frame are displayed to indicate where a contour of the second display layer will be located when the second display layer is in the visible mode.

19. A system for providing a user interface for maximizing an amount of information presented on a computer generated display, comprising:
   a user interface management system for receiving messages from an operating system that manages computer resources including a display screen and a user input device for tracking position, and in particular, messages in response to the user input device, and for sending messages to the operating system effecting changes in the computer generated display, and for receiving messages from and sending messages to an application program using the user interface; wherein the user interface comprises at least a first display layer for displaying a primary dynamic image and a second display layer for displaying a secondary dynamic image, the second layer having a plurality of display modes including a first mode corresponding to at least a portion of the second layer assuming a transparent state in the computer generated display, and wherein the display mode is selected according to signals received from the user input device.

20. The system as claimed in claim 19, wherein the mode of the second display layer is selected according to a position of a display position indicator.

21. The graphical user interface of claim 20, wherein the mode of the second display layer is visible when the position of the display position indicator is within a boundary of a display window of the second display layer.

22. The system as claimed in claim 19, wherein the plurality of modes further comprises a normally transparent mode, a timed mode, a locked mode, and a timed-icon mode, wherein for the normally transparent mode the second display layer is normally transparent, for the timed mode the second display layer is visible for a predetermined period of time and then becomes transparent, for the locked mode the second display layer is locked in the visible mode, and for the timed-icon mode the second display layer is visible for a predetermined period of time and then changes to an icon.

23. The system as claimed in claim 22, wherein the user selection is performed by depressing a prescribed button of the user input device.

24. The system as claimed in claim 23, wherein the user input device comprises buttons labeled normal, timed, locked, and timed-icon that correspond to the modes.

25. The graphical user interface of claim 22, wherein during the normally transparent mode, the second display layer becomes visible when a position of the display position indicator is within a boundary of a display window of the second display layer.

26. The graphical user interface of claim 19, wherein the primary dynamic image and the secondary dynamic image are updated without requiring a user command.

27. The graphical user interface of claim 26, wherein the primary and secondary dynamic images are updated independent of the display mode of the second layer, and independent of a position of the secondary dynamic image relative to the primary dynamic image.

28. The graphical user interface of claim 19, wherein at least one of the plurality of display modes comprises a normal mode, wherein the second display layer is opaque when a position indicator is coincident with the second display layer, and wherein the second display layer is transparent when a position indicator is not coincident with the second display layer.

29. The graphical user interface of claim 19, wherein at least one of the plurality of display modes comprises a timed mode, wherein the second display layer is opaque when the position indicator is coincident with the second display layer, wherein the second display layer remains opaque for a prescribed time period after the position indicator has changed from being coincident with the second display layer, and wherein the second display layer is transparent after the prescribed period of time has elapsed and the position indicator is not coincident with the second display layer.

30. The graphical user interface of claim 19, wherein at least one of the plurality of display modes comprises a timed-icon mode, wherein the second display layer is normally displayed as an opaque icon and changes to an opaque window when the position indicator is positioned over the opaque icon.

31. The graphical user interface of claim 30, wherein the second display layer remains in the opaque window state for a prescribed time period after the position indicator has been repositioned off of the opaque icon, and wherein the second display layer is displayed as the opaque icon after the prescribed time period has passed.

32. A graphical user interface for air traffic control, comprising:
    a first display layer for presenting aircraft tracking display data;
    a second display layer for presenting auxiliary data related to the aircraft tracking display data; and
    a display position indicator responsive to a user interface device; wherein
        the second display layer has a plurality of display modes comprising a first mode in which at least a portion of the second display layer is transparent and a second mode in which the second displayer layer is opaque.

33. The graphical user interface as claimed in claim 32, wherein the plurality of display modes further comprises a normally transparent mode in which at least a portion of the second display layer is transparent until the display position indicator is coincident with the second display layer.

34. The graphical user interface as claimed in claim 32, wherein the plurality of display modes further comprises a timed mode in which the portion of the second display layer is transparent until the display position indicator is positioned coincident with the second display layer, the second display layer then remaining visible for a predetermined period of time after the display position indicator is no longer positioned coincident therewith, and the portion of the second display layer then becoming again transparent.

35. The graphical user interface as claimed in claim 11, wherein the plurality of display modes further comprises a locked mode in which the second display layer is locked in a visible state.

36. The graphical user interface as claimed in claim 32, wherein the plurality of display modes further comprises a timed icon mode in which the second display layer is normally represented as a visible icon, and wherein the second layer is in a visible state when a position of the position indicator is coincident with the icon, and becomes transparent after a predetermined time period after the position of the position indicator is moved from the icon.

37. The graphical user interface of claim 32, wherein the graphical user interface is configured to dynamically update the first display layer and the second display layer without a user command.

38. The graphical user interface of claim 37, wherein the graphical user interface is further configured to update the first and second display layers independent of the display mode of the second layer, and independent of a position of the second layer relative to information on the first layer.

* * * * *